United States Patent [19]
D'Hont

[11] Patent Number: 5,497,121
[45] Date of Patent: Mar. 5, 1996

[54] AUTOMATICALLY CORRECTING DATA DETECTION CIRCUIT AND METHOD FOR FSK MODULATED SIGNALS

[75] Inventor: Loek D'Hont, Almelo, Netherlands

[73] Assignee: Texas Instruments Incorporated, Dallas, Tex.

[21] Appl. No.: 347,782

[22] Filed: Nov. 30, 1994

[51] Int. Cl.$^6$ .................................................. H04L 27/152
[52] U.S. Cl. ........................... 329/302; 375/327; 375/334
[58] Field of Search .................................. 329/300, 301, 329/302, 303; 375/324, 325, 327, 334

[56] References Cited

U.S. PATENT DOCUMENTS 4,488,120  12/1984  Carsten .................................. 329/302

*Primary Examiner*—Siegfried Grimm
*Attorney, Agent, or Firm*—James C. Kesterson; Richard L. Donaldson; William E. Hiller

[57] ABSTRACT

A data detection circuit (30) for automatically adjusting to an FSK modulated signal to set a proper trip point for differentiating logic high and low. The detection circuit (30) includes: A demodulator (32) which converts a received FSK modulated signal to voltage levels corresponding to respective frequencies of the modulated signal. A voltage clamp circuit (42) which samples and stores a voltage level of the output of the demodulator (32) and provides a trip point voltage level representing a sum of the stored voltage level and a fixed voltage offset. A comparator (50) which compares the trip point voltage to the voltage levels at the output of the demodulator (32) to provide a logic output signal representing detected digital data signals.

20 Claims, 1 Drawing Sheet

AUTOMATICALLY CORRECTING DATA DETECTION CIRCUIT AND METHOD FOR FSK MODULATED SIGNALS

TECHNICAL FIELD OF THE INVENTION

This invention relates in general to the field of electronic devices, and more particularly to an automatically correcting data detection circuit for frequency-shift keying modulated signals and a method of operation.

BACKGROUND OF THE INVENTION

Digital signals can be transmitted by frequency-shift keying (FSK) modulation. Frequency-shift keying modulation comprises shifting a continuous running carrier in frequency between two closely spaced frequencies according to the logical highs and lows being transmitted. The use of frequency-shift keying modulation can be effective in the presence of large signal fading from changing propagation conditions.

Some conventional demodulation circuits for FSK modulated signals use a differential amplifier to compare the outputs from a pair of filters set at the two frequencies corresponding to logical high and low. Narrow shift FSK modulated signals have been used to circumvent selective fading between the two signal frequencies. However, the shift cannot be reduced below the information band width of the keyed signal itself.

One application of a high frequency FSK modulated signal is for communication in a contactless key identification system. In such a system, a transponder in a key transmits a signal to a key reader associated with a key lock. One problem that can occur with FSK modulated signals transmitted by a transponder in a key is a drift in frequency due to ambient temperature and other conditions. A drift in frequency causes a corresponding drift in the frequencies corresponding to logical high and low. This causes problems with processing the FSK modulated signal to detect transmitted data.

SUMMARY OF THE INVENTION

A need has arisen for a data detection circuit that accurately processes frequency-shift keying modulated signals despite frequency drift due to ambient temperatures and other conditions.

In accordance with the present invention, an automatically correcting data detection circuit for frequency-shift keying modulated signals and a method of operation are provided that substantially eliminate or reduce disadvantages and problems associated with conventional data detection circuits.

According to one embodiment of the present invention, an automatically correcting data detection circuit for frequency-shift keying modulated signals is provided. A demodulator has an input and an output. The demodulator is operable to receive a modulated signal at the input, to convert the modulated signal to voltage level corresponding to respective frequencies of the modulated signal and to provide the voltage level at the output. A voltage clamp circuit has an input and an output. The input of the voltage clamp circuit is coupled to the output of the demodulator. The voltage clamp circuit is operable to sample and store a voltage level of the output of the demodulator and is operable to provide a trip point voltage level at the output of the voltage clamp circuit representing a sum of the stored voltage level and a fixed voltage offset. A comparator has a first input, a second input and an output. The first input of the comparator is coupled to the output of the voltage clamp circuit. The second input of the comparator is coupled to the output of the demodulator. The comparator is operable to compare the output of the voltage clamp circuit to the output of the demodulator and to provide a logic output signal at the output of the comparator in response.

BRIEF DESCRIPTION OF THE DRAWINGS

A more complete understanding of the present invention and advantages thereof may be acquired by reference to the following description taken in conjunction with the accompanying drawings in which like reference numbers indicate like features, and wherein.

DETAILED DESCRIPTION OF THE INVENTION

Figure 1:
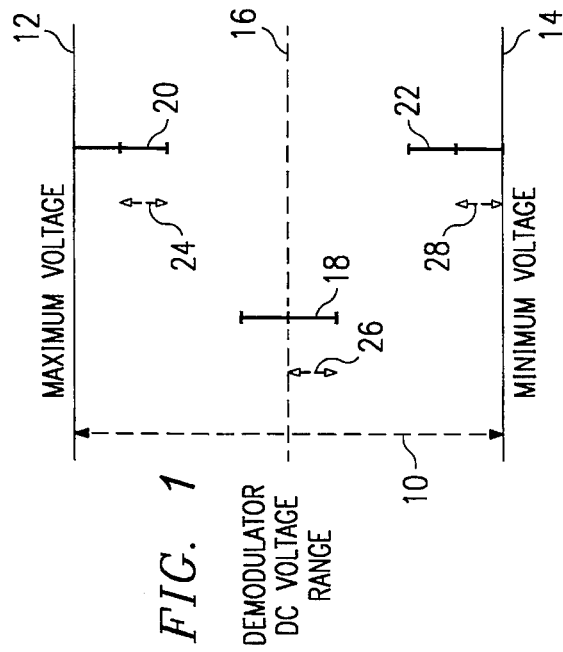
FIG. 1 illustrates frequency drift of frequency-shift keying modulated signals.

FIG. 1 illustrates frequency drift of frequency-shift keying (FSK) modulated signals. FIG. 1 shows demodulator output ranges corresponding to FSK modulated signals in a contactless key identification system in which signals are transmitted from a transponder in a key to a key reader associated with a key lock. This embodiment is chosen for purpose of description and is not intended nor should be construed to limit the scope of the present invention.

FIG. 1 shows frequency ranges of FSK modulated signals according to a DC output voltage range of a demodulator receiving the FSK modulated signals. The output voltage level of the demodulator corresponds to the frequency of the signal. As shown, an output voltage range 10 of the demodulator has a maximum voltage level 12 and a minimum voltage level 14. A center voltage level 16 lies in the middle of voltage range 10. Under ideal conditions, an FSK modulated signal varies within voltage range 18. Thus, logic high and low differ from center voltage level 16 by a voltage shift 26.

A voltage range 20 represents a worst case upwards drifted FSK modulated signal. A voltage range 22 represents a worst case downwards drifted FSK modulated signal. A voltage range 24 and a voltage range 28 represent the voltage shift of logic high and low from the center of voltage range 20 and voltage range 22, respectively.

Frequency drift of the FSK modulated signals can be caused by ambient temperature and other conditions. Despite frequency drift, the magnitude of voltage shift 4, voltage shift 26, and voltage shift 28 are substantially equal. A problem caused by frequency drift is that the demodulator output voltage range for each FSK modulated signal is different. Consequently, there is an uncertainty as to what voltage level to which to compare the demodulator output voltage to determine whether a logical high or a logical low was transmitted.

One embodiment of a contactless key identification system uses FSK modulated telegrams to transmit information from a transponder in a key to a key reader associated with a key lock. In this embodiment, the key reader sends a power burst signal to the key which activates the transponder in the key and provides power to the transponder for transmitting a telegram to the key reader in response after the power burst signal has completed.

The transponder in the key transmits an FSK modulated telegram to the key reader after the transponder is activated. In this embodiment, the FSK modulated telegram comprises: two bytes of run-in bits, one byte of start bits, eight bytes of data, two bytes of cyclic redundancy check bits and one byte of stop bits. The two bytes of run-in bits comprise logic lows. In this embodiment, as FSK modulated signals, the run-in bits correspond to the high frequency of the FSK modulation range.

In this embodiment, a 122 kHz signal corresponds to a logic high and a 132 kHz signal corresponds to a logic low. The appropriate trip point between a logical high and a logical low is 128 kHz provided there is no frequency drift. However, the ambient temperature of the transponder in the key can range from −40° C. to +80° C. Frequency drift of the FSK modulated telegrams may occur as the key varies within this temperature range. Because of the frequency drift, a data detection circuit for the signals must accurately process the FSK modulated telegrams regardless of the magnitude of drift.

Figure 2:
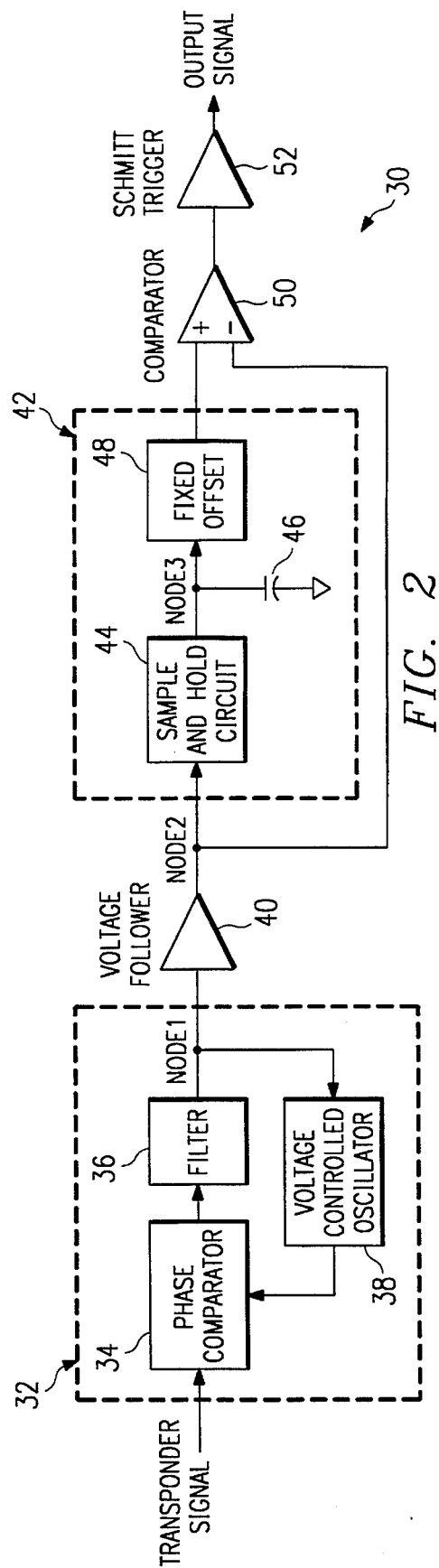
FIG. 2 illustrates one embodiment of an automatically correcting data detection circuit for frequency-shift keying modulated signals constructed according to the teachings of the present invention.

FIG. 2 illustrates one embodiment of an automatically correcting data detection circuit, indicated generally at 30, for FSK modulated signals constructed according to the teachings of the present invention. Automatically correcting data detection circuit 30 accurately processes FSK modulated signals despite frequency drift and independent of signal data content.

Automatically correcting data detection circuit 30 automatically adjusts to an FSK modulated signal to set a proper trip point for differentiating logic high and low. The embodiment of FIG. 2 is configured to convert an FSK modulated telegram from a transponder in a key to logic device compatible output signals.

Data detection circuit 30 includes a demodulator 32. In the illustrated embodiment, demodulator 32 comprises a phase locked loop. A phase comparator 34 receives the FSK modulated transponder signal. Phase comparator 34 provides an output to a loop filter 36 and receives an input from a voltage controlled oscillator 38. Loop filter 36 provides an output to a first node, NODE 1. Voltage controlled oscillator 38 receives an input from NODE 1. A voltage follower 40 is coupled to NODE 1 and to a second node, NODE 2.

A voltage clamp circuit 42 receives an input from NODE 2. Voltage clamp circuit 42 includes a sample-and-hold circuit 44 that receives an input from NODE 2 and provides an output to a third node, NODE 3, as shown. A capacitor 46 is coupled between NODE 3 and ground potential. A fixed offset voltage source 48 is coupled to NODE 3 and provides an output.

A comparator 50 has two inputs. As shown, one input receives the output from fixed offset voltage source 48 and the second input is coupled to NODE 2. Comparator 50 provides an output to a Schmitt trigger 52. Schmitt trigger 52, in turn, provides an output signal for data detection circuit 30.

In operation, automatically correcting data detection circuit 30 operates to receive an FSK modulated transponder signal and convert the signal to logic device compatible output signals. In the illustrated embodiment, demodulator 32 operates as a conventional phase locked loop. Phase comparator 34 compares the transponder signal to the output of voltage controlled oscillator 38. Phase comparator 34 then provides a voltage output responsive to the difference between the frequency of the transponder signal and the frequency of the output of voltage controlled oscillator 38. Loop filter 36 filters the output of phase comparator 34 and provides a voltage level to NODE 1. Voltage controlled oscillator 38 then receives the voltage level at NODE 1 and changes the frequency of the output of voltage controlled oscillator 38 in response. In this manner, demodulator 32 operates to provide a voltage level at NODE 1 that varies according to the frequency of the transponder signal. Voltage follower 40 receives the voltage level at NODE 1 and sets NODE 2 to the voltage level at NODE 1.

Voltage clamp circuit 42 operates to set a trip point voltage level to which the voltage level of NODE 2 can be compared. Sample-and-hold circuit 44 samples the voltage level at NODE 2 and provides the sampled voltage level to NODE 3. In the illustrated embodiment, sample-and-hold circuit 44 samples NODE 2 when NODE 2 represents a logic low during receipt of the run-in bits described previously. Sample-and-hold circuit 44 is controllable by a control signal to sample NODE 2 at a desired point in time and for a desired length of time. Sample-and-hold circuit 44 can comprise a controlled switch connecting NODE 2 to NODE 3 for a desired period of time. Sample-and-hold circuit 44 provides the sampled voltage level to NODE 3 which is stored by capacitor 46. The voltage level of NODE 3 then is equal to a voltage level representing a logic low.

The trip point voltage level is desired to be approximately at the center of the voltage range of the output of demodulator 32 between a logic low and a logic high for a given FSK modulated signal in order to accurately distinguish logic low and logic high. Fixed offset voltage source 48 subtracts a fixed voltage offset from the voltage level of NODE 3 to provide comparator 50 with an appropriate trip point voltage level. In this manner, data detection circuit 30 adjusts automatically to an FSK modulated signal such that the trip point voltage level is centered within the FSK modulation range.

Comparator 50 then compares the trip point voltage level provided by voltage clamp circuit 42 to the voltage level of NODE 2. The voltage level of NODE 2 is above the trip point voltage level when the signal being processed is a logic low where logic low corresponds to the higher FSK modulation frequency. Conversely, the voltage level of NODE 2 is below the trip point voltage level when the signal being processed is a logic high where logic high corresponds to the lower FSK modulation frequency. Comparator 50 provides an output signal representing a logic low or logic high depending upon whether the voltage level of NODE 2 is above or below the trip point voltage level. Schmitt trigger 52 operates to produce clean edges on the output of comparator 50 such that the output signal is appropriate for use by conventional logic devices.

In the illustrated embodiment, accurately detecting the digital data from the demodulated signal at NODE 2 can be problematic because of a varying DC voltage drift of each FSK modulated transponder signal. Automatically correcting data detection circuit 30 solves this problem by setting one input of comparator 50 to a trip point voltage level at the center of the voltage range of the FSK modulated signal being received. Data detection circuit 30 uses the voltage level corresponding to logic low as a reference for setting the trip point voltage level, thus automatically correcting to match the signal being transmitted. Fixed offset voltage source 48 subtracts a fixed offset voltage appropriate for the voltage range of the output demodulator 32 corresponding to the frequency range of the FSK modulated signal. In an alternate embodiment, data detection circuit 30 uses the voltage level corresponding to the logic high and adds a fixed offset.

In the illustrated embodiment voltage clamp circuit 42 clamps one input of comparator 50 to a trip point voltage level equal to the sum of the output voltage of demodulator 32 corresponding to a logic low plus a fixed offset. With respect to the transponder telegram transmitted by a key described above, the two bytes of run-in bits are logic lows and are used for a reference. In one embodiment of the present invention, sample-and-hold circuit 44 samples NODE 2 approximately one millisecond after the end of the power burst signal. Sample-and-hold circuit 44 provides the voltage level of NODE 2 to NODE 3 for approximately one-half of a millisecond. This timing allows sample-and-hold circuit 44 to sample the run-in bits and to store on capacitor 46 a voltage level representing a logic low for the duration of the telegram. The fixed voltage offset is subtracted in order to center the trip point voltage level in the middle of the voltage range of the demodulated FSK signal. The output signal from data detection circuit 30 is a clean logic device compatible data output that is accurate and independent of any frequency drift of the transponder signal or offset caused by voltage controlled oscillator 38.

A technical advantage of the present invention is accurate data detection of FSK modulated signals independent of FSK modulated signal frequency drift caused by temperature changes or use of different components and independent of errors potentially introduced by a voltage controlled oscillator. According to the teachings of the present invention, the FSK modulated signal itself, is sampled for a reference to automatically adjust to the FSK modulated signal. The teachings of the present invention are beneficial to any data detection circuit used with FSK modulated signals. Although the illustrated embodiment uses a logic low as a reference, alternate embodiments of the present invention can sample a voltage level corresponding to a logic high and add a fixed offset to set an appropriate trip point voltage level. The embodiments described herein are not intended and should not be construed to limit the scope of the present invention.

Although the present invention has been described in detail, it should be understood that various changes, substitutions and alterations can be made hereto without departing from the spirit and scope of the invention as defined by the appended claims.

What is claimed is:

1. A data detection circuit for frequency-shift keying modulated signals, comprising:

a demodulator having an input and an output, the demodulator operable to receive a modulated signal at the input, to convert the modulated signal to voltage levels corresponding to respective frequencies of the modulated signal and to provide the voltage levels at the output;

a voltage clamp circuit having an input and an output, the input of the voltage clamp circuit coupled to the output of the demodulator, wherein the voltage clamp circuit is operable to sample and store a voltage level of the output of the demodulator and is operable to provide a trip point voltage level at the output of the voltage clamp circuit representing a sum of the stored voltage level and a fixed voltage offset; and a comparator having a first input, a second input and an output, the first input of the comparator coupled to the output of the voltage clamp circuit and the second input of the comparator coupled to the output of the demodulator, wherein the comparator is operable to compare the output of the voltage clamp circuit to the output of the demodulator and to provide a logic output signal at the output of the comparator in response.

2. The data detection circuit of claim 1, wherein the voltage clamp circuit is operable to sample and store the voltage level of the output of the demodulator at a point in time when the output of the demodulator represents a logic low, and the voltage clamp circuit is further operable to add a fixed voltage offset equal to a negative of approximately one-half of a demodulation range of the modulated signal.

3. The data detection circuit of claim 1, wherein the voltage clamp circuit is operable to sample and store the voltage level of the output of the demodulator at a point in time when the output of the demodulator represents a logic high, and the voltage clamp circuit is further operable to add a fixed voltage offset equal to approximately one-half of a demodulation range of the modulated signal.

4. The data detection circuit of claim 1, further comprising a voltage follower having an input and an output, the input of the voltage follower coupled to the output of the demodulator and the output of the voltage follower coupled to the input of the voltage clamp circuit, such that the voltage follower is disposed between the demodulator and the voltage clamp circuit.

5. The data detection circuit of claim 1, further comprising a Schmitt trigger having an input and an output, the input of the Schmitt trigger coupled to the output of the comparator, such that the Schmitt trigger provides a logic device compatible output signal at the output of the Schmitt trigger.

6. The data detection circuit of claim 1, wherein the demodulator comprises a phase locked loop.

7. The data detection circuit of claim 1, wherein the demodulator comprises a phase locked loop, the phase locked loop comprising:

a phase comparator having a first input, a second input and an output, the first input of the phase comparator coupled to receive the modulated signal;

a filter having an input and an output, the input of the filter coupled to the output of the phase comparator and the output of the filter coupled to the input of the voltage clamp circuit; and a voltage controlled oscillator having an input and an output, the input of the voltage controlled oscillator coupled to the output of the filter and the output of the voltage controlled oscillator coupled to the second input of the phase comparator.

8. The data detection circuit of claim 1, wherein the voltage clamp circuit comprises:

a sample and hold circuit having an input and an output, the input of the sample and hold circuit coupled to the output of the demodulator;

a capacitor coupled to the output of the sample and hold circuit and to ground potential; and a fixed offset voltage source having an input and an output, the input of the fixed offset voltage source coupled to the output of the sample and hold circuit, and the output of the fixed offset voltage source coupled to the first input of the comparator.

9. The data detection circuit of claim 1, wherein the demodulator is operable to receive a modulated signal comprising a transponder signal transmitted from a key.

10. The data detection circuit of claim 1, wherein the demodulator is operable to receive a modulated signal comprising a transponder signal transmitted from a key that includes two bytes of run-in bits that comprise logic lows.

11. An automatically correcting data detection circuit for frequency-shift keying modulated signals, comprising:
- a phase locked loop operable to receive a modulated signal, to convert the modulated signal to voltage levels corresponding to respective frequencies of the modulated signal and to provide the voltage levels, the phase locked loop comprising;
  - a phase comparator having a first input, a second input and an output, the first input of the phase comparator coupled to receive a modulated signal;
  - a filter having an input and an output, the input of the filter coupled to the output of the phase comparator and the output of the filter coupled to the input of a voltage clamp circuit; and
  - a voltage controlled oscillator having an input and an output, the input of the voltage controlled oscillator coupled to the output of the filter and the output of the voltage controlled oscillator coupled to the second input of the phase comparator;
- a voltage follower having an input and an output, the input of the voltage follower coupled to the output of the filter;
- the voltage clamp circuit being operable to sample and store a voltage level of the output of the filter and operable to provide a trip point voltage level representing a sum of the stored voltage level and a fixed voltage offset, the voltage clamp circuit comprising:
  - a sample and hold circuit having an input and an output, the input of the sample and hold circuit coupled to the output of the filter;
  - a capacitor coupled to the output of the sample and hold circuit and to ground potential; and
  - a fixed offset voltage source having an input and an output, the input of the fixed offset voltage source coupled to the output of the sample and hold circuit;
- a comparator having a first input, a second input and an output, the first input of the comparator coupled to the output of the fixed offset voltage source and the second input of the comparator coupled to the output of the filter, wherein the comparator is operable to compare the output of the fixed offset voltage source to the output of the filter and to provide a logic output signal at the output of the comparator in response; and
- a Schmitt trigger having an input and an output, the input of the Schmitt trigger coupled to the output of the comparator, such that the Schmitt trigger provides a logic device compatible output signal at the output of the Schmitt trigger.

12. The data detection circuit of claim 11, wherein the voltage clamp circuit is operable to sample and store the voltage level of the output of the filter at a point in time when the output of the filter represents a logic low, and the voltage clamp circuit is further operable to add a fixed voltage offset equal to a negative of approximately one-half of a demodulation range of the modulated signal.

13. The data detection circuit of claim 11, wherein the voltage clamp circuit is operable to sample and store the voltage level of the output of the filter at a point in time when the output of the filter represents a logic high, and the voltage clamp circuit is further operable to add a fixed voltage offset equal to approximately one-half of a demodulation range of the modulated signal.

14. The data detection circuit of claim 11, wherein the phase locked loop is operable to receive a modulated signal comprising a transponder signal transmitted from a key.

15. The data detection circuit of claim 11, wherein the phase locked loop is operable to receive a modulated signal comprising a transponder signal transmitted from a key that includes two bytes of run-in bits that comprise logic lows.

16. A method of detecting data from a frequency-shift keying modulated signal, comprising the steps of:
- receiving a modulated signal;
- converting the modulated signal to voltage levels corresponding to respective frequencies of the modulated signal;
- sampling and storing one of said voltage levels representing a logic level;
- providing a trip point voltage equal to a sum of the stored voltage level and a fixed voltage offset;
- comparing the voltage levels corresponding to the frequency of the modulated signal to the trip point voltage level; and
- providing a logic output responsive to the step of comparing.

17. The method of claim 16, wherein the step of sampling and storing comprises sampling and storing a voltage level representing a logic low, and wherein the step of providing a trip point voltage uses a fixed voltage offset approximately equal to a negative of one-half a demodulation range of the modulated signal.

18. The method of claim 16, wherein the step of sampling and storing comprises sampling and storing a voltage level representing a logic high, and wherein the step of providing a trip point voltage uses a fixed voltage offset approximately equal to one-half a demodulation range of the modulated signal.

19. The method of claim 16, wherein the steps are accomplished by an electronic circuit.

20. The method of claim 16, wherein the step of receiving comprises receiving a modulated signal transmitted by a key used in a contactless key identification system.

* * * * *